United States Patent
Rule et al.

(10) Patent No.: US 7,525,711 B1
(45) Date of Patent: Apr. 28, 2009

(54) ACTIVELY TUNABLE ELECTROMAGNETIC METAMATERIAL

(75) Inventors: Donald W. Rule, Silver Spring, MD (US); Kevin A. Boulais, Waldorf, MD (US); Francisco Santiago, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 311 days.

(21) Appl. No.: 11/504,859

(22) Filed: Aug. 16, 2006

Related U.S. Application Data

(60) Provisional application No. 60/713,615, filed on Aug. 31, 2005.

(51) Int. Cl.
*G02F 1/03* (2006.01)
*G02F 1/00* (2006.01)
*H01P 7/00* (2006.01)

(52) U.S. Cl. .................. 359/244; 359/321; 359/241; 333/235

(58) Field of Classification Search ............. 333/219, 333/220, 221, 235; 343/700 MS, 911 R; 359/241, 321, 244, 240
See application file for complete search history.

(56) References Cited

U.S. PATENT DOCUMENTS

| 5,689,275 | A | 11/1997 | Moore et al. |
| 6,211,066 | B1 | 4/2001 | Stumborg et al. |
| 7,405,866 | B2 * | 7/2008 | Kuekes et al. ............... 359/321 |
| 2001/0040530 | A1 | 11/2001 | Livingston et al. |
| 2008/0165079 | A1 * | 7/2008 | Smith et al. ............. 343/911 R |
| 2008/0296710 | A1 * | 12/2008 | Tonucci ...................... 257/421 |

OTHER PUBLICATIONS

K.A. Boulais et al. "Tunable split-ring resonator for metamaterials using photocapacitance of semi-insulating GaAs", Applied Physics Letters 93, 043518 (2008).*
V.J. Logeeswaran et al. "Switching between positive and negative permeability by photoconductive coupling for modulation of electromagnetic radiation", Appl. Phys. A 87, 209-216 (2007).*
J.B. Pendry, A.J. Holden, D.J. Robbins, W.J. Stewart, IEEE Trans. Microwave Theory Tech. 47, 2075(1999).
J.B. Pendry et al., J. Phys. Condens. Matter 10, 4785 (1998).
V. G. Veselago, The electrodynamics of substances with simultaneously negative values of e and u Sov. Phys. USPEKHI 10, 509 (1968).
D.R. Smith et al, Composite Medium with Simultaneously Negative Permeability and Permittivity, Phys. Rev. Lett. 84, 4184-4187 (2000).

(Continued)

*Primary Examiner*—David N Spector
(74) *Attorney, Agent, or Firm*—Richard A. Morgan

(57) ABSTRACT

In one general aspect, a tunable electromagnetic metamaterial as described herein includes a substrate and an array of split ring resonators formed on the substrate. At least one of the split ring resonators is a capacitively tuned split ring resonator. The capacitively tuned split ring resonator includes a structure having a gap and is formed of an electrically conductive material. The capacitively tuned split ring resonator also includes a region of photo-capacitive material formed in close proximity to the structure such that the capacitance of the metamaterial is changed when illuminated by controlling electromagnetic radiation having a selected range of wavelengths.

25 Claims, 6 Drawing Sheets

OTHER PUBLICATIONS

R.A. Shelby, D.R. Smith, S. Schultz, Science 292, 77 (2001).
A.F. Starr et al., Phys. Rev. B 70, 113102 (2004).
T. J. Yen et al., Science 303, 1494-1496 (2004).
R.R. Romanofsky, et al., Analysis and Optimization of Thin Film Ferroelectric Phase Shifters, 3-14, Mat. Res. Soc. Symp. Proc. vol. 603 (Materials Res. Soc. 2000).
W.J. Kim, et al., Frequency Agile Microwave Applications Using (Ba, Sr) $TiO_3$/$Y_3Fe_5O_{12}$ Multilayer Grown by Pulsed Laser Deposition, 123-128, Mat. Res. Soc. Symp. Proc. vol. 603 (Materials Res. Soc. 2000).
Nader Engheta, Sudarshan R. Nelatury, and Ahmad Hoofar, The Role of Geometry in forming Metamaterials with Negative Permitivity and Permeability.
K. Zdansky, Quasistatic capacitance-voltage characteristics of plane parallel structures:Metal/semi-insulator/metal, J. Appl. Phys. 88, 2024-2029 (2000).
F. Dubecky et al., C-V analysis of the Schottky barrier in undoped semi-insulating GaAs, Semicond. Sci. Technol. 9, 1654-1658 (1994).
J. Lagowski et al., Native hole trap in bulk GaAs and its association with double-charge state of the arsenic antisite defect, Appl. Phys. Lett. 47, 929-931 (1985).
P. Omlimg, P. Silverberg, and L. Samuelson, Identification of a second energy level of EL2 in n-type GaAs, Phys. Rev. B 38, 3606-3609 (1988).
M. R. Brozel and G. E. Stillman, eds., Properties of Gallium Arsenide, third edition, p. 349 (INSPEC London, 1996).
John B. Pendry and David R. Smith, Reversing Light with Negative Refraction, Physics Today 57, 37 (2004).
S W Lee, Y Kuga, & A Ishimaru,Quasi-Static Analysis of Materials with Small Tunable Stacked Split Ring Resonators,Progress in Electromagnetics,Research,PIER 51,219-229,2005.
W J Padilla, A J Taylor, C Highstrete, Mark Lee, & R D Averitt, Dynamical Electric & Magnetic Metamaterial Response at Terahertz Frequencies PRL 96, 107401-1-107401-4 (2006).
Nader Engheta, An Idea for Thin Subwavelength Cavity Resonators Using Metamaterials With Negative Permittivity & Permeability, IEEE Antennas & Wireless Propagation Letters, vol. 1, 10-13, 2002.

\* cited by examiner

ACTIVELY TUNABLE ELECTROMAGNETIC METAMATERIAL

CROSS-REFERENCE TO RELATED APPLICATIONS

This application claims the benefit of U.S. Provisional Application No. 60/713,615, filed Aug. 31, 2005, which is incorporated by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an electromagnetic metamaterial, and in particular to an actively tunable electromagnetic metamaterial.

BACKGROUND

Artificial resonant structures known as split ring resonators (SRRs) can be designed to produce a negative effective magnetic permeability $\mu_{eff}$ in a fixed, narrow frequency band. A circuit made of a conducting trace or wire with a gap will operate analogously to a resonant circuit consisting of a resistor (R), an inductor (L), and a capacitor (C)—i.e., an RLC circuit. The physical dimension, "a," of the circuit typically is such that a<<$\lambda$, where $\lambda$ is the wavelength of the subject electromagnetic radiation of interest.

Periodic arrays of SRRs have been combined with periodic arrays of straight wires to yield an effective electric permittivity $\in_{eff}$ (dielectric constant) that can be engineered to have specific values in a frequency band of interest. The quantities $\mu_{eff}$ and $\in_{eff}$ are the relative permeability and permittivity—the actual values are obtained by multiplying $\mu_{eff}$ and $\in_{eff}$ by the vacuum values of $\mu_0$ and $\in_0$ respectively. The combined effective permittivity and permeability result in an effective index of refraction, $n_{eff}$, where $n_{eff}=(\mu_{eff}\in_{eff})^{1/2}$, that can possess values not found in naturally occurring materials or blends of naturally occurring materials. In particular, if $\mu_{eff}$ and $\in_{eff}$ are both negative then $n_{eff}$ will be negative.

Materials having a negative $n_{eff}$ are referred to as "left-handed materials" (LHM) or negative index materials (NIM). A NIM has some remarkable properties. For example, in a NIM the direction of refraction is opposite that of normal materials and the Doppler effect shifts frequencies in the opposite direction compared to normal materials. A NIM is one particular example of an engineered electromagnetic material, but other examples exist. Such engineered electromagnetic materials are referred to as electromagnetic "metamaterials." Metamaterials are designed to have properties that are not found in the constituent materials and are not typically found in nature. The special electromagnetic properties of the metamaterial result mainly from its geometrical structure.

It is desirable to make an effective metamaterial that can be actively tunable with values of effective magnetic permeability and permittivity not achievable by other methods or materials. It also is desirable to make an effective metamaterial that can be employed in a wide range of device applications and over a wide range of subject electromagnetic radiation frequencies.

SUMMARY

As described herein, a metamaterial may be designed to have an effective magnetic permeability, $\mu_{eff}$, that may be actively tuned, switched, and/or modulated in the vicinity of a particular frequency band of subject electromagnetic radiation. The tunable characteristic of the metamaterial is based on the use of a capacitor made from a photo-capacitive material—i.e., a material that changes its capacitance when exposed to controlling electromagnetic radiation such as light. One example of such a photo-capacitive material is semi-insulating (SI) GaAs. A single tunable device made from the metamaterial may replace several fixed frequency devices. The metamaterial typically is designed to have values of $\mu_{eff}$ that are not found in natural materials. Techniques for producing these metamaterials also are described. The geometry of the metamaterial components may be scaled in order to design and fabricate tunable materials to operate over a wide range of subject frequencies. For example, the metamaterial may be designed to operate over frequencies ranging from radar up to the infrared. In other implementations, the metamaterial may be designed to operate over other frequencies such as below radar or above the infrared.

First, the metamaterial is tuned by illuminating it with controlling electromagnetic radiation. Next, the tuned metamaterial is illuminated with subject electromagnetic radiation and the metamaterial then acts upon the subject electromagnetic radiation to achieve a desired result. The way in which the tuned metamaterial acts upon the subject electromagnetic radiation enables it to be used in a variety of applications. For example, the metamaterial may be used in applications involving actively tunable devices for the control of electromagnetic radiation such as microwave antennas, frequency selective surfaces, compact waveguides, waveguide couplers, phase shifters, negative index lenses for beam shaping and control, impedance matching for more efficient antennas, low observable or stealth materials, and communications devices such as couplers, switches, and modulators.

In one general aspect, a tunable electromagnetic metamaterial as described herein includes a substrate and an array of split ring resonators formed on the substrate. At least one of the split ring resonators is a capacitively tuned split ring resonator. The capacitively tuned split ring resonator includes a structure having a gap and is formed of an electrically conductive material. The capacitively tuned split ring resonator also includes a region of photo-capacitive material formed in close proximity to the structure such that the capacitance of the metamaterial is changed when illuminated by controlling electromagnetic radiation having a selected range of wavelengths.

Implementations may include one or more of the following. For example, the photo-capacitive material may be semi-insulating GaAs. The photo-capacitive material may be formed in the gap of the structure and/or formed over the structure. The photo-capacitive material may have a band gap of approximately 1.4 eV. For instance, the photo-capacitive material may have a band gap of 1.424 eV at a temperature of 300 degrees K. The photo-capacitive material may be undoped or may be formed by doping with a deep level trapping material. A wire may be formed at a location on a side of the substrate that is opposite from a side of the substrate on which the array is formed. The structure may have various shapes. For example, the structure may have a square shape or a round shape.

In one implementation, the array of split ring resonators may be a two dimensional array of split ring resonators. In another implementation, the metamaterial also may include a second substrate and a second array of split ring resonators formed on the second substrate. At least one of the split ring resonators of the second array includes a capacitively tuned split ring resonator. The capacitively tuned split ring resonator includes a structure having a gap and formed of an electrically conductive material and a region of photo-capacitive material formed in close proximity to the structure such that the capacitance of the metamaterial is changed when the photo-capacitive part is illuminated by controlling electromagnetic radiation having a selected range of wavelengths. The substrate and the second substrate are arranged to form a three dimensional array of split ring resonators.

In one implementation, the substrate includes two or more substrate layers and the structure is formed within at least two of the substrate layers. For instance, the substrate may include a first substrate layer, a second substrate layer formed on the first substrate layer, and a third substrate layer formed on the second substrate layer. The structure may be formed within the first substrate layer, the second substrate layer, and the third substrate layer.

In another general aspect, a method may include providing an electromagnetic metamaterial, illuminating the metamaterial with controlling electromagnetic radiation having a selected range of wavelengths, and controlling the controlling electromagnetic radiation by one or more of changing a wavelength of the controlling electromagnetic radiation, changing an intensity of the controlling electromagnetic radiation, or controlling the structure of one or more pulses of the controlling electromagnetic radiation. The metamaterial includes a substrate and an array of split ring resonators formed on the substrate. At least one of the split ring resonators includes a capacitively tuned split ring resonator. The capacitively tuned split ring resonator includes a structure having a gap. The structure is formed of an electrically conductive material. A region of photo-capacitive material is formed in close proximity to the structure. Controlling the structure of the pulses includes controlling the pulses' temporal structure.

In another general aspect, a capacitively tuned split ring resonator includes a structure having a gap and formed of an electrically conductive material and a region of photo-capacitive material formed in close proximity to the structure such that the capacitance of the metamaterial is changed when illuminated by controlling electromagnetic radiation having a selected range of frequencies.

Implementations may include one or more of the following features. For example, the photo-capacitive material may be semi-insulating GaAs. The photo-capacitive material may be formed in various locations. For example, the photo-capacitive material may be formed in the gap of the structure and/or formed over the structure. The photo-capacitive material may have a band gap of approximately 1.4 eV. The region of photo-capacitive material may be formed as the substrate of the structure.

In one implementation, the substrate includes two or more substrate layers and the structure is formed within at least two of the substrate layers. For example, the substrate may include a first substrate layer, a second substrate layer formed on the first substrate layer, and a third substrate layer formed on the second substrate layer. The structure may be formed within the first substrate layer, the second substrate layer, and the third substrate layer. The structure may have various shapes. For example, the structure may have a square shape or a round shape.

Other features will be apparent from the description, the drawings, and the claims.

BRIEF DESCRIPTION OF THE DRAWINGS

FIG. 1b is an exemplary three dimensional metamaterial that may be constructed using the metamaterial of FIG. 1a.

FIG. 2a is a top view of one implementation of an exemplary actively tunable split ring resonator for use in the metamaterial of FIG. 1a.

FIG. 2b is a top view of a portion of the exemplary actively tunable split ring resonator of FIG. 2a.

FIG. 2c is a side cut-away view of the exemplary actively tunable split ring resonator along line C-C of FIG. 2a.

FIG. 3a is a top view of another implementation of an exemplary actively tunable split ring resonator for use in the metamaterial of FIG. 1a.

FIG. 3b is a top view of a portion of the exemplary actively tunable split ring resonator of FIG. 3a.

FIG. 3c is a side cut-away view of the exemplary actively tunable split ring resonator along line C-C of FIG. 3a.

FIG. 4 is a perspective view of yet another implementation of an exemplary actively tunable split ring resonator for use in the metamaterial of FIG. 1a.

DETAILED DESCRIPTION

An actively tunable electromagnetic metamaterial as described herein is based upon one or more arrays of capacitively tuned split ring resonators (SRRs) and provides an effective magnetic permeability that may be actively tuned, switched, and/or modulated. The arrays of SRRs may be used with or without wire arrays in order to tune the active frequency of the effective magnetic permeability and dielectric permittivity and, therefore, the effective index of refraction.

The tunable characteristic of the metamaterial is based on the use of a capacitor made from a photo-capacitive material. The capacitance of the photo-capacitive material, and therefore the resonant frequency of the RLC circuit of which it is a part, can be changed by the controlling electromagnetic radiation. In other implementations, materials that change their inductance when exposed to controlling electromagnetic radiation may be used to tune the resonant frequency of the RLC circuit.

Figure 1A:
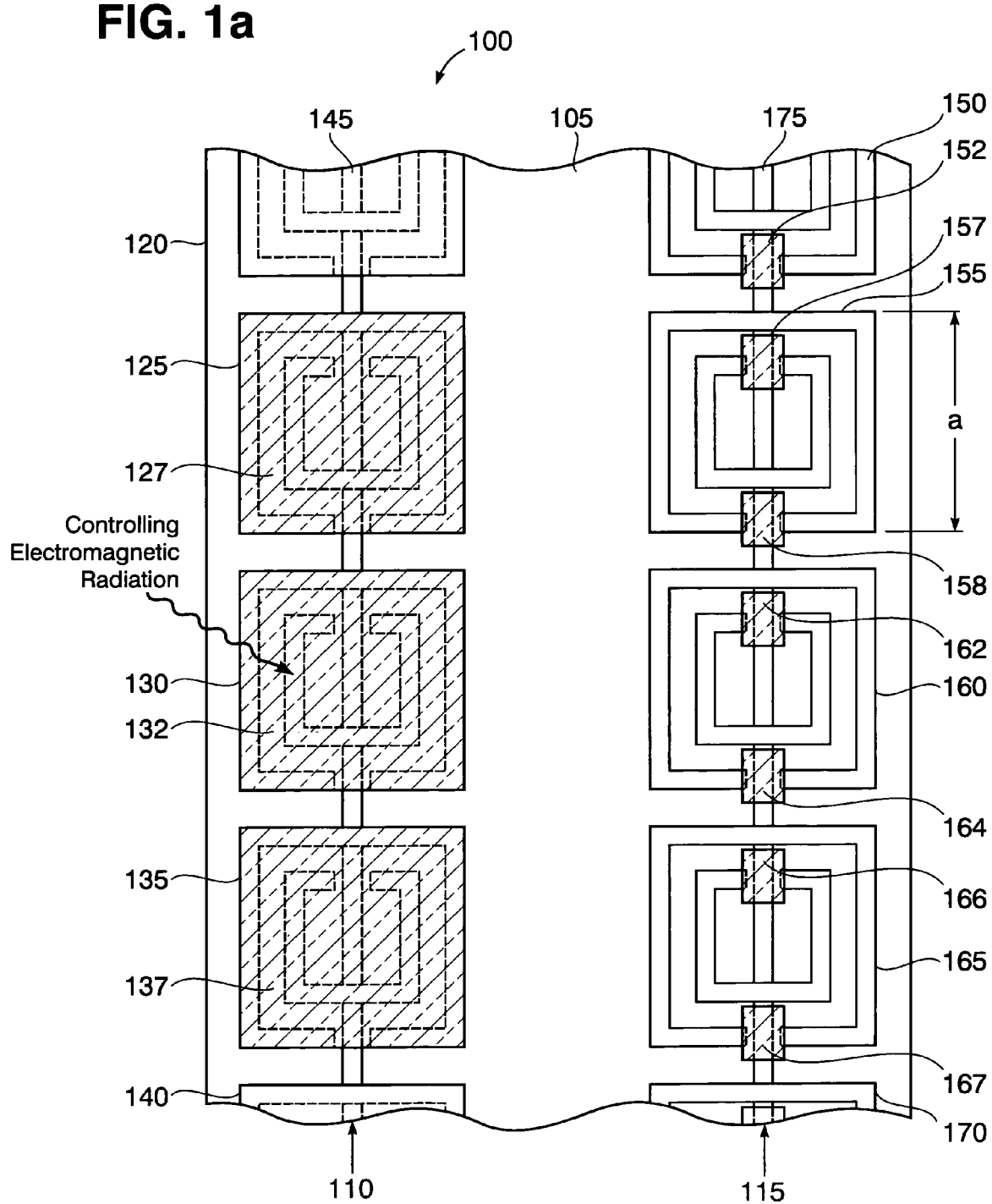
FIG. 1a is an exemplary actively tunable electromagnetic metamaterial.

As shown in FIG. 1a, a metamaterial 100 includes a substrate 105 and one or more arrays 110, 115 of SRRs formed on the substrate 105. The substrate 105 may be made from a circuit board material or from other suitable materials. In one implementation, the substrate 105 may be made of a photo-capacitive material. The SRRs may be made from an electrical conductor, such as copper, aluminum, gold or other suitable materials. The arrays 110, 115 of SRRs may be formed on the substrate using techniques known in the art. Wires 145, 175 optionally may be formed on the substrate 105 in the vicinity of arrays 110, 115 using techniques known in the art.

In another implementation, wires may be patterned on a separate substrate which may be intercalated with the substrate containing the SRR patterns. In one implementation, the wires 145, 175 are formed on a side of the substrate 105 opposite from the side where the arrays 110, 115 are formed.

An array of SRRs includes multiple SRRs and may have one or more dimensions. The SRRs within an array may be the same or may differ in size, shape, and construction. For example, one or more of the SRRs in the array may be actively tunable, and the tunable SRRs within the array may be tunable over different frequency ranges of subject radiation. The structure of each SRR may be the same or may differ. For instance, an SRR structure may have a ring shape, such as a circular or a square ring, or may have other shapes. The arrays of SRRs may be scaled in size and may be constructed using known techniques such as lithographic techniques for integrated circuit production. Various types of arrays may be combined in the metamaterial 100.

Figure 1B:
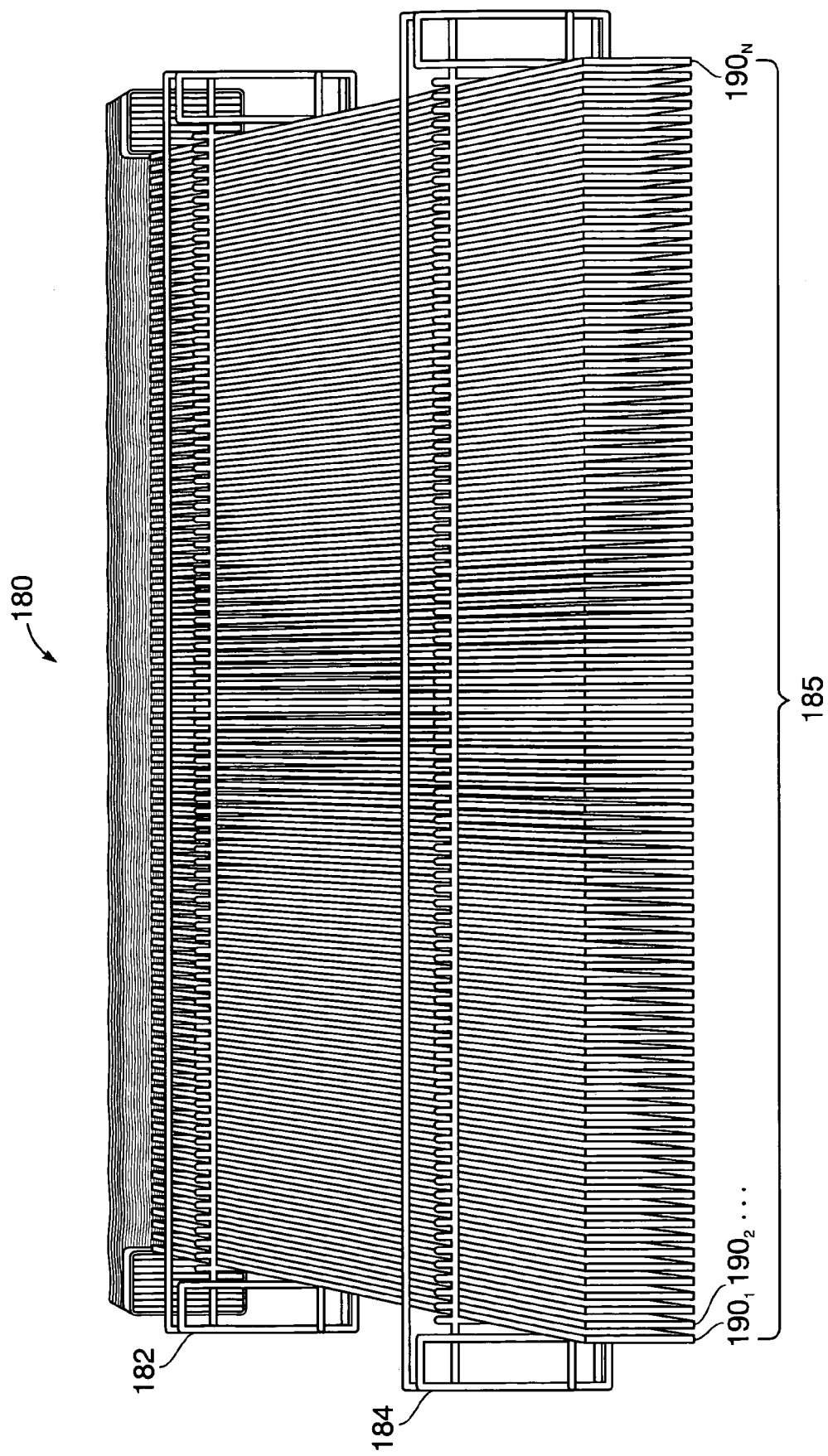

FIG. 1*b* shows an exemplary implementation of a metamaterial 180 that includes a three dimensional array of SRRs. As shown, mechanical supports 182, 184 hold an integer number N of two dimensional sheets 190$_1$, 190$_2$, through 190$_N$ in a stacked arrangement 185. In another implementation, the two dimensional sheets may be spaced apart by a low dielectric constant filler material instead of the mechanical supports 182, 184. The sheets 190$_1$, 190$_2$, through 190$_N$ are spaced apart at a distance that may be constant or that may vary between adjacent pairs of sheets. The two dimensional sheets 190$_1$, 190$_2$, through 190$_N$ each may include a two-dimensional array of SRRs and may have a construction similar to that described with respect to metamaterial 100. The two dimensional sheets 190$_1$, 190$_2$, through 190$_N$ may have the same construction or may vary in construction.

Referring again to FIG. 1*a*, array 110 includes SRRs 120, 125, 130, 135, and 140. SRRs 125, 130, and 135 are actively tunable. SRR 125 includes photo-capacitive material region 127, SRR 130 includes photo-capacitive material region 132, and SRR 135 includes photo-capacitive material region 137. In the implementation of FIG. 1*a*, and as discussed with respect to FIG. 2 below, photo-capacitive material regions 127, 132, and 137 are formed over top of and are sized to cover SRRs 125, 130, and 135. Array 115 includes SRRs 150, 155, 160, 165, and 170. SRRs 150, 155, 160, and 165 are actively tunable. SRR 150 includes one photo-capacitive region 152, SRR 155 includes two photo-capacitive regions 157, 158, SRR 160 includes two photo-capacitive regions 162, 164, and SRR 165 includes two photo-capacitive regions 166, 167. In the implementation of FIG. 1*a*, and as discussed with respect to FIG. 3 below, photo-capacitive regions 152, 157, 158, 162, 164, 166, and 167 are formed to fit within a gap of the corresponding SRR. SRRs 125, 130, and 135 of array 110 and SRRs 150, 155, 160, and 165 of array 115 represent a number of implementations of actively tunable SRRs. Other implementations of actively tunable SRRs are possible.

The photo-capacitive material used in the photo-capacitive regions 127, 132, 137, 152, 157, 158, 162, 164, 166, and 167 may be, for example, a semi-insulating material such as semi-insulating gallium arsenide (SI-GaAs), but other suitable photo-capacitive materials can be used. Where SI-GaAs is used, it may either be undoped or intentionally doped to make it semi-insulating. In addition, the photo-capacitive material used may vary within an SRR or between SRRs within an array. The photo-capacitive material region(s) are provided in order to change the capacitance of the corresponding SRR when illuminated with controlling electromagnetic radiation of an appropriate wavelength. Characteristics of the controlling electromagnetic radiation, such as wavelength, intensity, and pulse structure may be controlled using known techniques to actively tune the capacitance of an SRR.

Figure 2A:
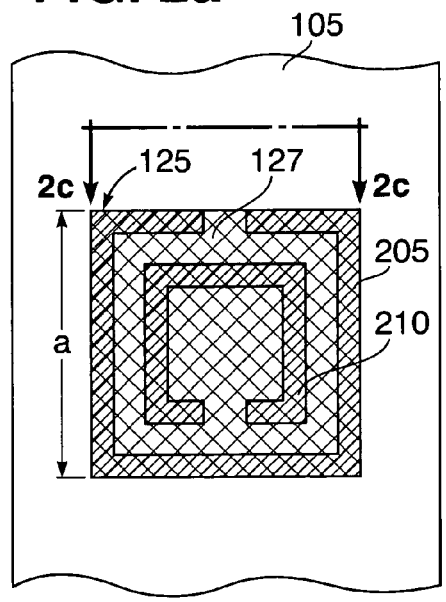

FIG. 2*a* shows a top view of actively tunable SRR 125 of FIG. 1*a*. SRR 125 is mounted on substrate 105 and includes an outer structure 205, an inner structure 210, and a photo-capacitive region 127 formed over the outer structure 205 and inner structure 210. The outer structure 205 and inner structure 210 of SRR 125 have a square shape, but other shapes may be used. In other implementations, an SRR may have one structure or more than two structures. As shown, photo-capacitive region 127 is formed over the entire area of structures 205 and 210. In other implementations, the photo-capacitive region may be formed in different locations of the SRR.

Figure 2C:
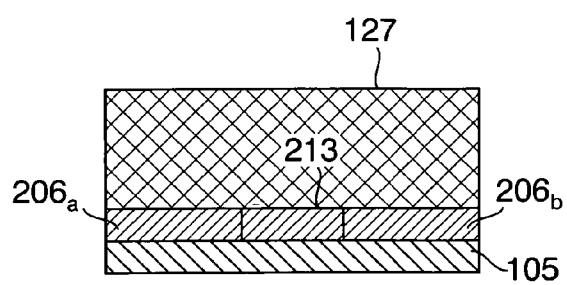
Figure 2B:
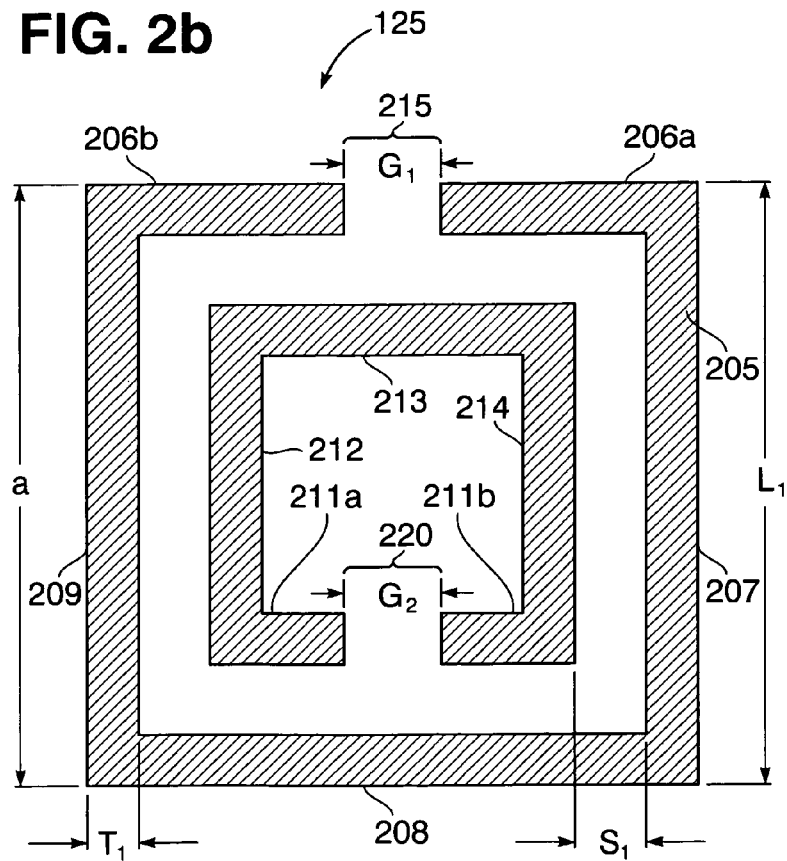

Referring to FIG. 2*b*, outer structure 205 includes first side portion 206*a*, first side portion 206*b*, second side 207, third side 208, and fourth side 209. There is a gap 215 of distance G1 between first side portion 206*a* and first side portion 206*b*. Each side 206*a*, 206*b*, 207, 208, and 209 has a thickness and a length. For example, side 209 has thickness T1 and length L1. Inner structure 210 includes first side portion 211*a*, first side portion 211*b*, second side 212, third side 213, and fourth side 214. There is a gap 220 of distance G2 between first side portion 211*a* and first side portion 211*b*. Each side 211*a*, 211*b*, 212, 213, and 214 has a thickness and a length. There is a space S1 between the outer structure 205 and inner structure 210. The space may be uniform or may differ between the corresponding sides of the outer structure 205 and inner structure 210.

The dimensions of the outer structure 205 and inner structure 210 are chosen based upon parameters such as the range of wavelengths corresponding to the operating frequency band of the device. The operating frequency band includes frequencies when the photo-capacitive region is illuminated and when it is not illuminated (dark-level frequency) by the controlling electromagnetic radiation. Typically, the wavelength ("λ") should be several times longer than the dimension ("a") of the SRR. This relationship is used for creating a material that can be characterized by effective indices of refraction, permeability, and permittivity because many unit cells are averaged over the space of one wavelength. For example, if an SRR is to be designed to operate at approximately 10 GHz (λ=30 mm), then the dimension "a" of the outer structure 205 of the SRR may be approximately 2.6 mm such that λ>>a.

FIG. 2*c* shows a side cut-away view of SRR 125 along line C-C of FIG. 2*a*. photo-capacitive material 127 is shown on top of SRR outer structure 205 first side portion 206*a*, first side portion 206*b*, and inner structure 210 third side 213. SRR outer structure 205 first side portion 206*a*, first side portion 206*b*, and inner structure 210 third side 213 are formed on top of substrate 105. In other implementations, the photo-capacitive material region 127 may extend downward to the substrate 105 to fill gaps such as the gap between outer structure 205 first side portion 206*a* and first side portion 206*b*. In some implementations, the substrate 105 may be a photo-capacitive material.

Figure 3A:
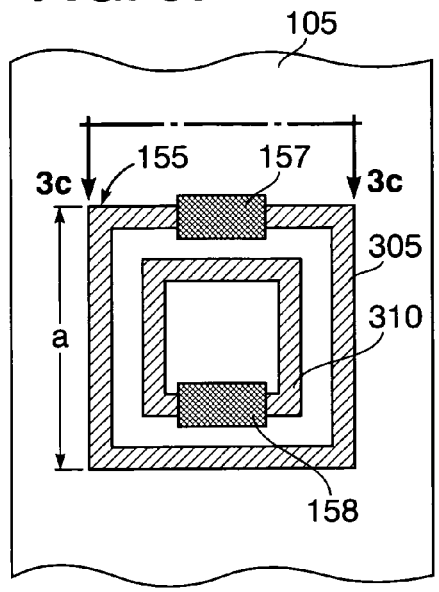

FIG. 3*a* shows a top view of actively tunable SRR 155 of FIG. 1*a*. SRR 155 is mounted on substrate 105 and includes an outer structure 305, an inner structure 310, and a photo-capacitive region 157 formed in a gap of the outer structure 305 and a photo-capacitive region 158 formed in a gap of the inner structure 310. The outer structure 305 and inner structure 310 of SRR 155 have a square shape, but other shapes may be used. In other implementations, an SRR may have one structure or more than two structures. As shown, photo-capacitive region 157 is formed in a gap of the outer structure 305 and a photo-capacitive region 158 formed in a gap of the inner structure 310. In some implementations, photo-capacitive region 158 or photo-capacitive region 157 may be omitted. For example, if a device has omitted photo-capacitive material region 158 such that the inner structure gaps are not filled with photo-capacitive material, but the photo-capacitive material region 157 is maintained in outer structure gaps of the SRRs, then the device will operate at the original frequency of the inner structures and, simultaneously, at the tunable frequencies of the outer structures. In other implementations, the photo-capacitive region may be formed in different locations of the SRR.

Figure 3C:
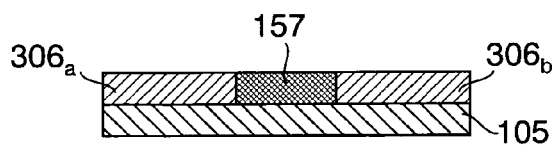
Figure 3B:
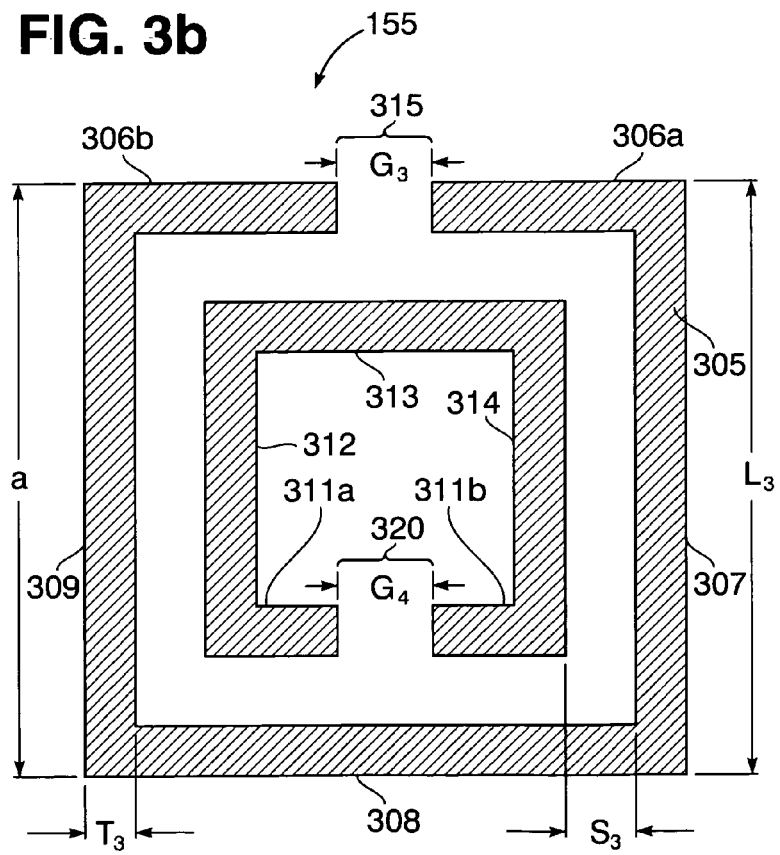

Referring to FIG. 3b, outer structure 305 includes first side portion 306a, first side portion 306b, second side 307, third side 308, and fourth side 309. There is a gap 315 of distance G3 between first side portion 306a and first side portion 306b. Each side 306a, 306b, 307, 308, and 309 has a thickness and a length. For example, side 309 has thickness T3 and length L3. Inner structure 310 includes first side portion 311a, first side portion 311b, second side 312, third side 313, and fourth side 314. There is a gap 320 of distance G4 between first side portion 311a and first side portion 311b. Each side 311a, 311b, 312, 313, and 314 has a thickness and a length. There is a space S3 between the outer structure 305 and inner structure 310. The space may be uniform or may differ between the corresponding sides of the outer structure 305 and inner structure 310.

The dimensions of the outer structure 305 and inner structure 310 are chosen based upon parameters such as the wavelengths of the operating frequency band of the device, including the dark-level frequency. Again, the wavelength ("λ") should be several times longer than the dimension ("a") of the SRR. As previously discussed, this relationship is used for creating a material that can be characterized by effective indices of refraction, permeability, and permittivity because many unit cells are averaged over the space of one wavelength.

FIG. 3c shows a side cut-away view of SRR 155 along line C-C of FIG. 3a. photo-capacitive material 157 is shown on top of substrate 105 between SRR outer structure 305 first side portion 306a and first side portion 306b. In other implementations, the photo-capacitive material region 157 may, for example, define an additional layer over at least a portion of the outer structure 305 and/or at least a portion of the inner structure 310. In some implementations, the substrate 105 may be undoped photo-capacitive material.

Figure 4:
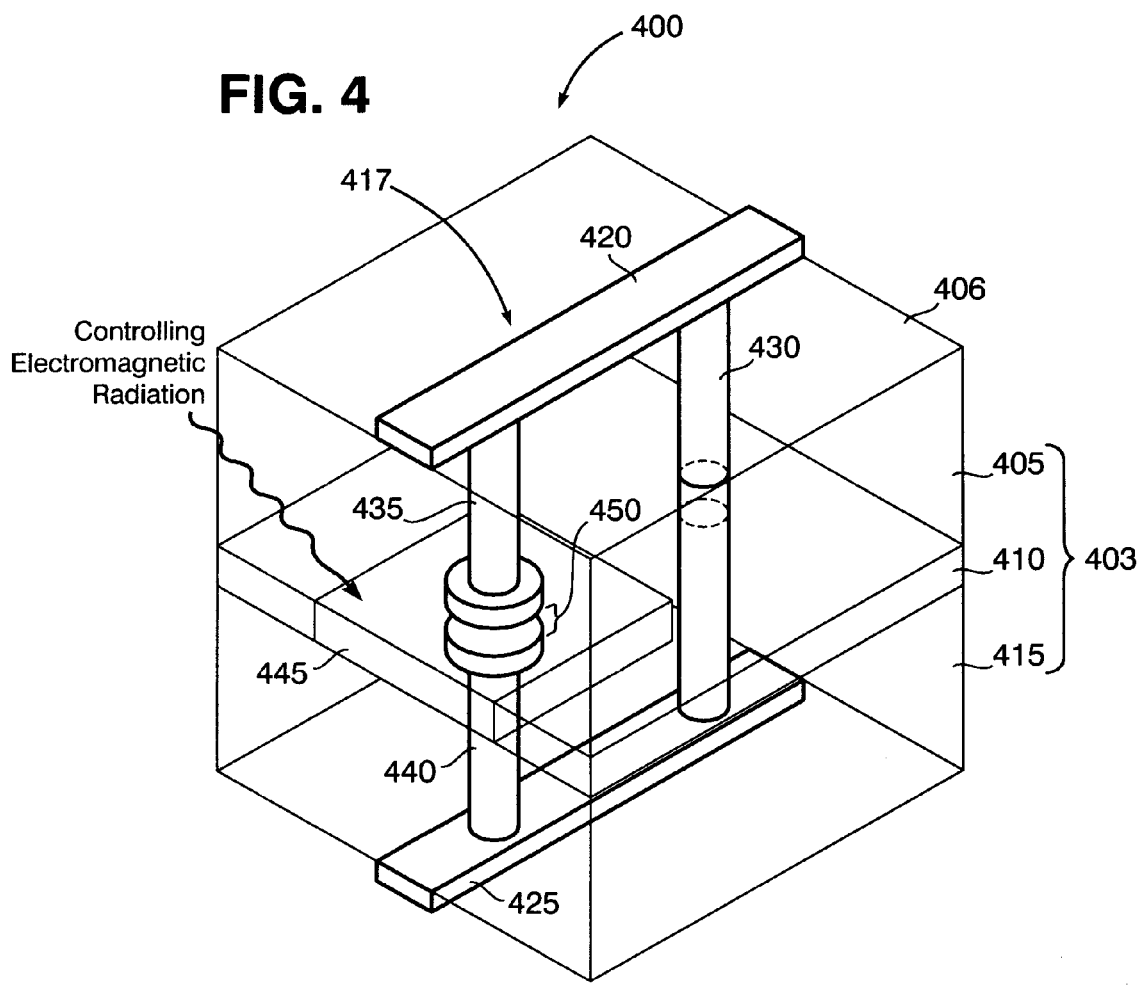

FIG. 4 illustrates another implementation of an actively tunable SRR 400. This SRR implementation has only one split ring structure per unit cell, as compared to the nested structure SRR implementations of FIG. 1a. The split ring 417 is formed in a substrate 403 by conductors 420 and 425 and by vias 430, 435, and 440. In the example of FIG. 4, the substrate 403 includes first substrate layer 405, second substrate layer 410, and third substrate layer 415. The first, second, and third substrate layers 405, 410, and 415 may be made of the same material or may be made of different materials. For example, the first and third substrate layers may be made of a first material and the second substrate layer may be made of a second material. The second substrate layer 410 may be fabricated with long wire arrays placed as wire pairs on either side of the second substrate layer for symmetry. This implementation takes advantage of standard circuit board fabrication techniques. In some implementations, more substrate layers may be used or fewer substrate layers may be used. Other implementations may use multiple split ring structures.

As shown, the split ring 417 of SRR 400 is perpendicular to a top surface 406 of the substrate 405. A gap 450 in the split ring 417 is formed by the blind vias 435 and 440 ending at opposite sides of the second substrate layer 410. A photo-capacitive material region 445 is fabricated within a portion of the second substrate material 410 that lies within the gap 450 of the split ring 417. The photo-capacitive material region 445 may be made of materials such as, for example, undoped SI-GaAs. In another implementation, the photo-capacitive material region 445 could include other areas such as the entire second substrate layer 410. As discussed with respect to FIG. 1a, the capacitance of the SRR 400 may be actively tuned by illuminating the photo-capacitive material region 445 with controlling electromagnetic radiation of the appropriate wavelength.

There are other geometries that, if used as the basis of the unit cell of a metamaterial, will produce a similar effect to that of the SRRs discussed above. Some examples of such circuits are: 1) a "Swiss roll," which consists of a thin conducting sheet and an insulating sheet rolled together; 2) an "omega" shaped element similar to the Greek letter Ω, or 3) a parallel pair of conducting wires of length "a"—where "a" is much less than the subject wavelength—separated by a thin substrate material made partially or completely of photo-capacitive material. A photo-capacitive material, such as undoped SI-GaAs, could be introduced into the capacitive regions of these configurations to provide tunability.

The described approach to actively tuning, switching, or modulating SRR arrays is based on the photo response properties of a photo-capacitive material, such as, for example, undoped semi-insulating GaAs, to controlling electromagnetic radiation (e.g., light). This photo response changes the capacitance of a capacitor containing the photo-capacitive material due to the redistribution of charge when the photo-capacitive material is illuminated by controlling electromagnetic radiation of the appropriate wavelength(s). The redistribution of charge can be thought of as an effective change of the dielectric coefficient of the material in the capacitor.

The photocapacitance effect will now be described in more detail with respect to how it occurs and how it may be used to tune the resonant frequency of SRRs. Although the following discussion refers primarily to undoped GaAs as the photo-capacitive material, other suitable photo-capacitive materials may be used.

Typically, undoped SI-GaAs is grown by the liquid-encapsulated Czochralski method. This is a commonly used commercial process for bulk material. However, other methods may be used. GaAs contains naturally occurring deep-level donor defects—atoms with a higher chemical valence energy than the host and thus are able to give up or donate electrons to the system. The dominant native point donor defect is associated with the EL2 (electron level 2) state which is believed to be due to a substitutional defect in which an atom of As occupies what would normally be a Ga site in the lattice—i.e., the $As_{Ga}$ antisite. GaAs has a band gap of 1.424 eV at room temperature (300 degrees Kelvin). Since the defects are deep level donors, but existing slightly below mid-gap, it is energetically favorable for their excited state ($EL2^+$) to compensate any shallow acceptors—atoms with a lower chemical valence energy than the host and thus are able to take or accept electrons from the system—lying just above the valence band (VB).

Here the shallow acceptors are unintentional impurity atoms, typically carbon, and are a result of the growth process. In other implementations, the acceptors may be intentional impurity atoms. If the density of deep donors, $N_{dd}$, is larger than the density of the shallow acceptors, $N_{sa}$, this compensation process essentially freezes out the thermal excitation of electrons from the VB to the vacant states in the acceptors. Any holes—the absence of electrons—present in the valence band effectively would be a result of the thermal excitation of electrons from the valence band into the conduction band (CB). In addition, because $N_{dd} > N_{sa}$, there will be some thermally excited electrons in the CB from the donors. Overall, there will be more electrons in the CB than holes in the VB and the material is slightly n-type, meaning that conduction mostly is done by the negatively charged electrons—the majority carriers. The density of intrinsic free carriers is $n_i = 2 \times 10^6$ cm$^{-3}$, a value that is characteristic of a semi-insulator. Thus, this material is referred to as semi-insulating (SI). This material overall is more suitable for low-loss capacitor formation.

When a metal is brought into intimate contact with a semiconductor, the Fermi levels must line up to establish thermal equilibrium. The contact between the metal and semiconductor forms one of two basic types of junctions. The first type of junction is known as an ohmic contact. The second type of junction is known as a Schottky junction, or a variation thereof. A Schottky junction is formed from a Schottky barrier, which blocks the flow of current in one direction (except for a small amount of leakage current) while allowing current to flow in the other direction. In other words, the Schottky junction is a diode.

When the diode is in a state where current cannot flow, a region exists near the metal, but within the semiconductor, that is depleted of free majority-carrier charge. This is known as a depletion region. The depletion region generally is filled with fixed charge left from ionized impurities. When the boundary at the edge of the depletion region (within the semiconductor) moves, more or less of the fixed ion charge is exposed. Thus, a change in capacitance occurs according to $\Delta C = \Delta(Q/V)$. The symbol Δ means "change in", C is the capacitance, Q is the charge, and V is the voltage across the capacitor.

A change in Q can occur in one of three ways: 1) thermal excitation; 2) applying a voltage across the region; or 3) optical excitation. For typical doped semiconductors, which have intentional impurities with electronic levels very close to the band edges, the states tend to already be fully ionized at room temperature. Therefore, very little change in capacitance is observed optically. However, a change in capacitance is observed due to a change in voltage with the approximate proportional relationship $C \propto V^{-1/2}$. In the case of an undoped photo-capacitive material, the material has deep level states that are not fully ionized at room temperature. Thus, the charge on these states can be manipulated optically—increasing the rate of ionization. The net change in charge changes the capacitance. The theoretical relationship between the optical flux density and the change in capacitance can be derived by those of ordinary skill in the art.

The charge distribution in the capacitor, and therefore the capacitance, further can be modified by illuminating the GaAs with controlling electromagnetic radiation (probe light) of the appropriate wavelength or energy in order to modify the charge state population of the EL2 deep donor states. EL2 is the dominant native point defect as compared to other levels such as, for example, EL3 and EL4. The most active state change is in EL2 from a neutral charge state EL(0) formed by electron occupation to the EL2(+1) charge state formed when an electron is stimulated into the conduction band. An energy of 0.74 eV (1.424 eV−0.68 eV) is required for this excitation at room temperature. The value of 0.68 eV is the accepted energy level value with respect to the valence band at 300K. For example, see D. C. Look and Z. Q. Fang, "On the energy level of EL2 in GaAs," Solid-State Electronics 43 (1999), at pages 1317-1319.

Figure 5:
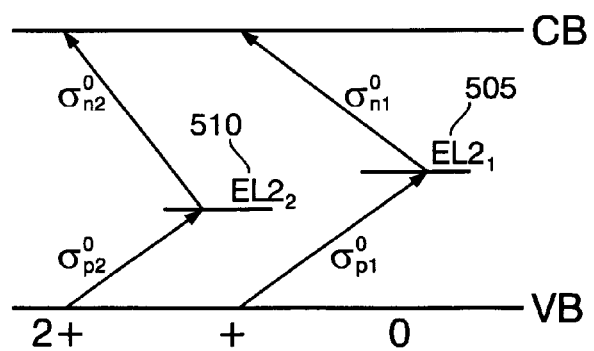
FIG. 5 is an exemplary energy level diagram for undoped semi-insulating GaAs.

FIG. 5 shows the EL2(0) state as EL2$_1$ (505). A second ionization state EL2(+2) exists for EL2 in which a second electron can be excited from the EL2(+1) state EL2$_2$ (510) into the conduction band forming a +2 charge state. However, under normal conditions, this is a much less probable event. The +2 state behaves mostly as an acceptor state in which an electron can be excited from the valence band. This +2 state contributes less to the photocapacitance at room temperature compared to the contributions of the 0/+1 states. For a more detailed discussion, see P. Omling, P. Silverberg, and L. Samuelson, "Identification of a second energy level of EL2 in n-type GaAs," Phys. Rev. B38, pages 3606-3609 (1988), which is the source of the data shown and discussed with respect to FIG. 5.

A depletion region (capacitance) can exist even without an applied voltage. For an ideal semiconductor, the depth of this depletion region at zero volts can be controlled by the work function of the metal contact in relationship to that of the semiconductor. However, GaAs typically has a high level of surface states that pin the Fermi level—causing the difference between the metal and GaAs work function to remain relatively constant. The density of surface states may be reduced by, among other things, using surface treatments such as chalcogen elements.

Common metals used with GaAs include aluminum and gold. Copper also may be used. For some metals, such as copper, it is desirable to use a diffusion barrier to prevent the metal from diffusing into the GaAs. For gold, it is common to use an under-layer of chromium as the diffusion barrier. For copper, a barrier can be formed from many materials, including Ba or BaF$_2$. Other metals and barriers are possible.

Another way to control the "dark-level" capacitance is to use an insulating layer between the photo-capacitive material and the metal. This layer works as a capacitance in series with the photocapacitance, which reduces the net effective capacitance and thereby controls it. The addition of the insulating layer also enhances efficiency because it blocks leakage current that might otherwise flow. Generally, it is beneficial to reduce the number of surface states in GaAs for this application of an insulator.

In the metamaterial, there typically will exist two photocapacitors when there are two metal electrodes. This can be modeled as a series configuration of a capacitor-resistor-capacitor, where the resistor is from the conductivity of the bulk photo-capacitive in the volume not occupied by, and generally between, the depletion regions which form the photocapacitors.

Figure 6:
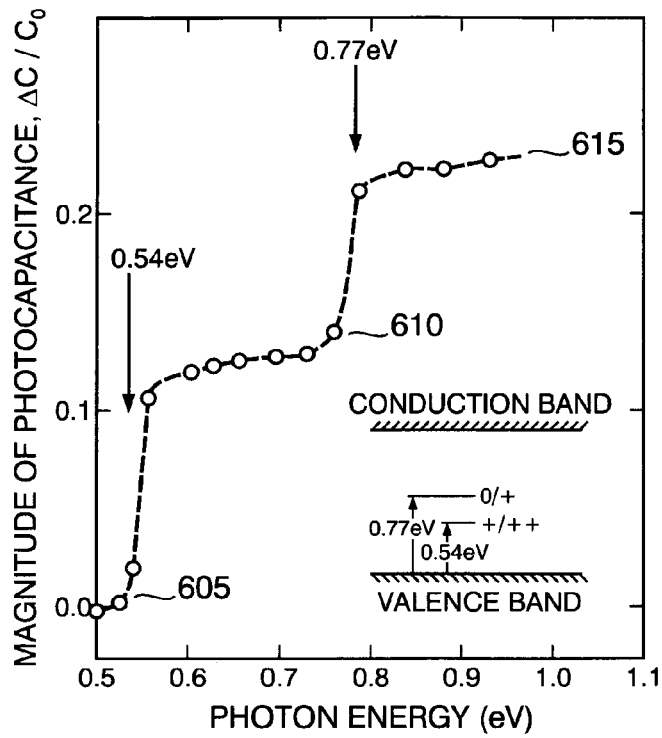
FIG. 6 is an exemplary low temperature spectrum of steady-state photocapacitance for GaAs illustrating the effect of light energy or frequency on capacitance.

FIG. 6 shows a photocapacitance spectrum measurement at 77 K. Three distinct levels (605, 610, 615) are shown, one for each charge state of EL2. The energies are referenced to the valence band. Note that the 0.77 eV value is within the range of experimental error of the accepted value of 0.73 eV at 77 degrees Kelvin. Excitation of electrons from the valence band is used to reduce the EL2 energy level excitation states. The band gap for GaAs is 1.424 eV (λ=0.89 μm) at 300 K. For the first transition with threshold energy of 0.54 eV (λ=2.3 μm), there is a 10% change in capacitance. For the second transition at 0.77 eV (λ=1.6 μm), there is an additional 10% change in relative capacitance for this particular experiment. Photoreduction of EL2 states, i.e., transitions of electrons from the valence band to EL2(+1), leaving the EL2(0) charge state (see FIG. 5), also will produce changes in photocapacitance for a photon energy above the photoionization threshold for EL2. For a more detailed discussion, see J. Lagowski, D. G Lin, T. P. Chen, M. Skowronski, and H. C. Gatos, "Native hole trap in bulk GaAs and its association with the double-charge state of the arsenic antisite defect," Appl. Phys. Lett. 47, pages 929-931 (1985), which is the source of the data shown and discussed with respect to FIG. 6.

Figure 7:
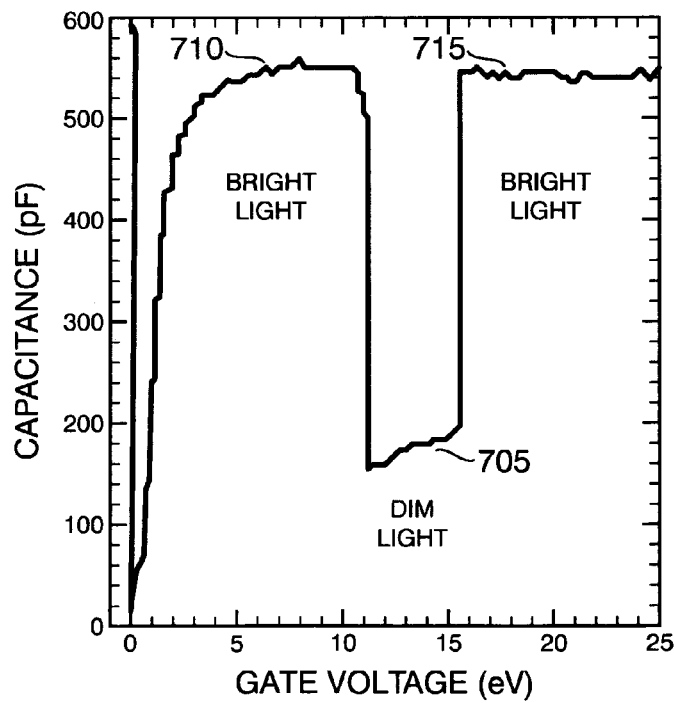
FIG. 7 is an exemplary diagram illustrating the effect of light intensity on the capacitance of semi-insulating GaAs.

FIG. 7 illustrates the effect of varying the intensity of the controlling electromagnetic radiation upon the capacitance of an exemplary undoped SI GaAs filled capacitor. In this example, a tungsten lamp was used as the source of the controlling electromagnetic radiation to produce a broad spectrum ranging from the infrared to visible light. There is approximately a 200% change in capacitance between the value in the region 705 labeled "dim light" and the value in the regions 710, 715 labeled "bright light." As the level of the controlling electromagnetic radiation was varied, the gate voltage was varied linearly with time. As shown, the capacitance is essentially independent of gate voltage above approximately 5 eV. Typical capacitances for this type of experiment were found to range from 0.035 pF/mm$^2$ to 0.118 pF/mm$^2$ for a 1 mm thick undoped SI-GaAs sample.

By incorporating a photo-capacitive material, such as GaAs, into the resonant structures and directing controlling electromagnetic radiation of the appropriate wavelength to the photo-capacitive material in the region of the capacitive part of the resonator, the capacitance of the photo-capacitive material loaded resonant structure can be varied in a controlled manner by choice of one or more of: 1) wavelength; 2) intensity; and 3) time structure of the controlling electromagnetic radiation pulses.

The dimension and placement of the photo-capacitive material also can be designed so that the combined split ring and photo-capacitive material will resonate at the desired subject frequency. Photo-capacitive material loaded capacitance can be incorporated either in series or in parallel with the capacitance of the SRR, depending on the magnitude of the change desired and the particular geometry of the SRR. The geometry of the split ring structures can be adjusted to compensate for the presence of the un-illuminated photo-capacitive material, for example, by modifying the inductance of the resonator independently of the capacitance.

In order to estimate the magnitude of the capacitance changes required to implement the capacitive tuning for the SRRs shown in FIGS. 1a and 4, the inductance of the SRR may be calculated in each case according to known methods and the capacitance C may be inferred from the measured resonant frequency:

$$f = \frac{1}{2\pi\sqrt{L_{tot}C}}$$

For one exemplary SRR according to FIG. 1a, $L_{tot}$=4.9 nano-Henries and f=1 GHz, yielding C=43 femto-Farads for the outer SRR only, neglecting any effects of the inner structure for simplicity. Similarly, for another exemplary SRR according to FIG. 4, the total inductance was $L_{tot}$=5.8 nano-Henries and the resonant frequency was f=8.5 GHz. This gives a capacitance of C=61 femto-Farads. Thus a shift of 10% in frequency would require a 20% change in capacitance, or ΔC=12 fF. Note that these are exemplary implementations only. Other implementations are possible, and the capacitive tuning concept can be scaled to other wavelengths.

Various methods may be used to guide the controlling electromagnetic radiation to the individual SRRs for tuning or controlling the metamaterial. In one implementation, the controlling electromagnetic radiation may travel through a suitable material used as the substrate 105 for an SRR array, as shown in FIG. 1a. In another implementation, the controlling electromagnetic radiation may travel through a suitable material used as the second substrate material 410, as shown in FIG. 4. In still another implementation, the controlling electromagnetic radiation may be guided to the photo-capacitive material by optical waveguides embedded in the dielectric material forming the substrate for the SRR arrays. Waveguides also may be formed directly in the dielectric substrate. These methods may be used alone or in combination, depending on such factors as, for example, the geometry of the metamaterial array structure, the subject radiation wavelength at which the device employing the metamaterial operates, and the wavelength of the controlling electromagnetic radiation used.

In yet another implementation, the controlling electromagnetic radiation may be modulated or switched by a separate electro-optical system (modulator) separate from the metamaterial. The modulator may be coupled to the photo-capacitive material sites in the metamaterial by, for example, fiber optic waveguides. In this case, different sections of the metamaterial array may be adjusted to have a different index of refraction. Such an approach may be used, for example, to produce a lens of tunable metamaterial that has a variable focal length as a function of time and frequency of the subject electromagnetic radiation to be focused. Such a controllable metamaterial also may be used, for example, as a beam director by adjusting the beam phase across the beam's wave front in a manner similar to the lens.

The described techniques enable the active tuning, switching, or modulating of the electromagnetic response versus frequency of a metamaterial designed to have a specified effective magnetic permeability $\mu_{eff}$ and electric permittivity $\in_{eff}$ (dielectric constant). This capability enables new parameter spaces for these electromagnetic properties and for the resulting effective index of refraction $n_{eff}$. For example, if $n_{eff}$ is negative (i.e., a NIM) there are many device applications which enable the manipulation of subject electromagnetic radiation in ways not possible with naturally occurring materials.

The tunable effect, especially for $\mu_{eff}$, is scalable over a wide range of subject radiation frequencies from, for example, radar or below to visible light or above. Using controlling electromagnetic radiation to control the tuning, switching, and/or modulation of the metamaterial means that no additional conducting circuits need to be introduced into the metamaterial and does not affect or interfere with the electromagnetic behavior of the metamaterial. As described, there are no moving mechanical parts, such as micro-electromechanical switches (MEMS) required to achieve the tuning, switching, or modulation. However, some implementations may use micro-electromechanical switches in combination with the described techniques.

The described metamaterial has a very low percentage of metal by weight and is relatively light. The size of unit cells of the metamaterial typically are much less than the wavelength of the radiation it is designed to propagate, thus the structures formed from such metamaterial are relatively compact.

The described techniques may be implemented with a variety of photo-capacitive materials. In one implementation, semiconductor materials such as, for example, GaP with a band gap of approximately 1.35 eV and greater may be used. Also, other dopant materials may be substituted for the deep level donors. For example, a copper dopant in GaAs will act as a deep level trap. In some implementations, contacts made of gold, aluminum, or other suitable materials may be used in place of copper contacts.

In another implementation, the photo-capacitive material may instead be a photo-reactive material that changes capacitance and/or inductance when exposed to controlling electromagnetic radiation. In this manner, the RLC circuit is tuned by changing the value or the capacitance, the inductance, or both the capacitance and the inductance.

The controlling electromagnetic radiation may have a variety of wavelengths such as, for example, wavelengths from the near infrared to the visible, depending on the specific geometry, the photo-capacitive material deep level trap energy levels in relation to the valence or conduction band edge, as well as the wavelengths of the operating band of the electromagnetic metamaterial.

A number of exemplary implementations have been described. Nevertheless, it will be understood that various modifications may be made. For example, suitable results may be achieved if components in a described component, system, architecture, or devices are combined in a different manner and/or replaced or supplemented by other components. Accordingly, other implementations are within the scope of the following claims.

What is claimed is:

1. A resonance frequency tunable electromagnetic metamaterial comprising:
    a substrate; and
    an array of split ring resonators formed on the substrate, wherein:
        at least one of the split ring resonators comprises a capacitively tuned split ring resonator, the capacitively tuned split ring resonator including a structure having a gap and formed of an electrically conductive material and a region of photo-capacitive material formed in close proximity to the structure such that the capacitance of the photo-capacitive material is changed and the resonance frequency of the metamaterial is thereby tuned by below the band gap energy illumination of the photo-capacitive material;
    the metamaterial in combination with below the band gap energy electromagnetic control radiation having a selected range of wavelengths.

2. The tunable electromagnetic metamaterial of claim 1, wherein the photo-capacitive material comprises semi-insulating GaAs.

3. The tunable electromagnetic metamaterial of claim 1, wherein the array of split ring resonators comprises a two dimensional array of split ring resonators.

4. The tunable electromagnetic metamaterial of claim 1, further comprising:
    a second substrate;
    a second array of split ring resonators formed on the second substrate, wherein:
        at least one of the split ring resonators of the second array comprises a capacitively tuned split ring resonator, the capacitively tuned split ring resonator including a structure having a gap and formed of an electrically conductive material and a region of photo-capacitive material formed in close proximity to the structure such that the capacitance of the photo-capacitive material is changed when illuminated by below the band gap energy electromagnetic control radiation having a selected range of wavelengths; and
    wherein the substrate and the second substrate are arranged to form a three dimensional array of split ring resonators.

5. The tunable electromagnetic metamaterial of claim 1, wherein the photo-capacitive material has band gap of approximately 1.4 eV.

6. The tunable electromagnetic metamaterial of claim 1, wherein the substrate comprises two or more substrate layers and the structure is formed within at least two of the substrate layers.

7. The tunable electromagnetic metamaterial of claim 6, wherein:
    the substrate comprises a first substrate layer, a second substrate layer formed on the first substrate layer, and a third substrate layer formed on the second substrate layer; and
    the structure is formed within the first substrate layer, the second substrate layer, and the third substrate layer.

8. The tunable electromagnetic metamaterial of claim 1 wherein the structure has a square shape.

9. The tunable electromagnetic metamaterial of claim 1 wherein the structure has a round shape.

10. The tunable electromagnetic metamaterial of claim 1 wherein a wire is formed at a location on a side of the substrate that is opposite from a side of the substrate on which the array is formed.

11. A method comprising:
    providing a resonance frequency tunable electromagnetic metamaterial, the metamaterial comprising
        a substrate; and
        an array of split ring resonators formed on the substrate, wherein:
            at least one of the split ring resonators comprises a capacitively tuned split ring resonator, the capacitively tuned split ring resonator including a structure having a gap and formed of an electrically conductive material and a region of photo-capacitive material formed in close proximity to the structure;
    illuminating the photo-capacitive material with below the band gap electromagnetic control radiation having a selected range of wavelengths; and
    by means of the photo-capacitive effect, tuning the metamaterial resonant frequency by one or more of changing a wavelength of the controlling electromagnetic radiation, changing an intensity of the electromagnetic control radiation, or changing the structure of one or more pulses of the electromagnetic control radiation.

12. The method of claim 11 wherein changing the structure of one or more pulses comprises changing a temporal structure of the pulses.

13. A capacitively tuned split ring resonator comprising:
    a structure having a gap and formed of an electrically conductive material; and
    a region of photo-capacitive material formed in close proximity to the structure such that the capacitance of the photo-capacitive material is changed when illuminated by electromagnetic control radiation; the split ring resonator in combination with below the band gap energy electromagnetic radiation in the near infrared to visible range of frequencies.

14. The capacitively tuned split ring resonator of claim 13, wherein the photo-capacitive material comprises semi-insulating GaAs.

15. The capacitively tuned split ring resonator of claim 13, wherein the photo-capacitive material is formed in the gap of the structure.

16. The capacitively tuned split ring resonator of claim 13, wherein the photo-capacitive material is formed over the structure.

17. The capacitively tuned split ring resonator of claim 13, wherein the region of photo-capacitive material is formed as a substrate of the structure.

18. The capacitively tuned split ring resonator of claim 13, wherein the substrate comprises two or more substrate layers and the structure is formed within at least two of the substrate layers.

19. The capacitively tuned split ring resonator of claim 18, wherein:
the substrate comprises a first substrate layer, a second substrate layer formed on the first substrate layer, and a third substrate layer formed on the second substrate layer; and
the structure is formed within the first substrate layer, the second substrate layer, and the third substrate layer.

20. The capacitively tuned split ring resonator of claim 13 wherein the structure has a square shape.

21. The capacitively tuned split ring resonator of claim 13 wherein the structure has a round shape.

22. A resonance frequency tunable system including:
an electromagnetic metamaterial comprising:
(a.) a substrate and an array of split ring resonators formed on the substrate, wherein:
at least one of the split ring resonators comprises a photo-capacitively tuned split ring resonator including an electrically conductive structure and a region of photo-capacitive material formed in close proximity to the structure;
(b.) a source of below the band gap energy electromagnetic radiation in the range of near infrared to visible frequencies and an electro-optical modulator controlling the below the band gap energy electromagnetic radiation therefrom; and
(c.) an optical waveguide illuminating the photo-capacitive material with electromagnetic radiation from the source and electro-optical modulator.

23. The resonance frequency tunable system of claim 22 wherein the electro-optical modulator controls wavelength of the below the band gap energy electromagnetic radiation in the range of near infrared to visible frequencies.

24. The resonance frequency tunable system of claim 22 wherein the electro-optical modulator controls intensity of the below the band gap energy electromagnetic radiation at a frequency selected in the range of near infrared to visible frequencies.

25. The resonance frequency tunable system of claim 22 wherein the electro-optical modulator controls temporal structure of below the band gap energy electromagnetic radiation pulses.

* * * * *